United States Patent

Binder et al.

[11] Patent Number: 6,159,261
[45] Date of Patent: Dec. 12, 2000

[54] FILTER CARTRIDGE

[75] Inventors: Walter Binder, Backnang; Heinz Mueller, Remseck, both of Germany

[73] Assignee: Filterwerk Mann & Hummel GmbH, Ludwigsburg, Germany

[21] Appl. No.: 09/254,134

[22] PCT Filed: Jul. 31, 1997

[86] PCT No.: PCT/EP97/04179

§ 371 Date: Jun. 11, 1999

§ 102(e) Date: Jun. 11, 1999

[87] PCT Pub. No.: WO98/08589

PCT Pub. Date: Mar. 5, 1998

[30] Foreign Application Priority Data

Aug. 28, 1996 [DE] Germany ............... 196 34 720

[51] Int. Cl.[7] ........................ B01D 46/24
[52] U.S. Cl. ............... 55/502; 55/498; 55/520
[58] Field of Search ............ 55/498, 502, 507, 55/511, 520

[56] References Cited

U.S. PATENT DOCUMENTS

| | | | |
|---|---|---|---|
| 5,415,677 | 5/1995 | Ager et al. ................... | 55/502 |
| 5,484,466 | 1/1996 | Brown et al. ................. | 55/502 |
| 5,487,767 | 1/1996 | Brown ......................... | 55/502 |
| 5,536,290 | 7/1996 | Stark et al. .................. | 55/502 |
| 5,547,480 | 8/1996 | Coulonvaux .................. | 55/502 |
| 5,556,440 | 9/1996 | Mullins et al. ................ | 55/502 |
| 5,685,985 | 11/1997 | Brown et al. ................. | 55/502 |
| 5,720,790 | 2/1998 | Kometani et al. ............. | 55/502 |
| 5,730,769 | 3/1998 | Dungs et al. .................. | 55/502 |
| 5,733,351 | 3/1998 | Hult et al. .................... | 55/502 |
| 5,755,843 | 5/1998 | Sundquist ..................... | 55/502 |
| 5,897,676 | 4/1999 | Engel et al. .................. | 55/502 |
| 5,935,281 | 8/1999 | Rotheiser et al. ............. | 55/502 |
| 5,954,849 | 9/1999 | Berkhoel et al. .............. | 55/502 |

*Primary Examiner*—Duane Smith
*Assistant Examiner*—Minh-Chan T. Pham
*Attorney, Agent, or Firm*—Evenson, McKeown, Edwards & Lenahan, P.L.L.C.

[57] ABSTRACT

A filter cartridge, in particular for an intake air filter of an internal combustion engine, the cartridge including a hollow cylindrical filtering body (10) which is provided on at least one end face with an end disk. The end disk carries a sealing element (12) which is made up of a supporting medium and a sealing medium (15). The sealing medium is preferably composed of a silicone or a silicone foam.

7 Claims, 4 Drawing Sheets

FILTER CARTRIDGE

BACKGROUND OF THE INVENTION

The invention relates to a filter cartridge, in particular for an intake air filter of an internal combustion machine.

A filter cartridge of this type is described in DE 88 05 049 U1. Such filter cartridges, however, have the disadvantage that the outer margin of the supporting and sealing ring can slip from the filter paper web in cases of extreme stress, since only a force locking connection is present. At that point a direct connection between the raw air inlet and the clean air outlet results; the flow cross-section of which is indeed small, but which can result in disturbances or an increased wear and tear of the internal combustion machine which is arranged downstream.

DE-OS 27 38 086 shows a filter cartridge which is composed of a filter material and a flange piece which is molded onto it and which is made of a moldable, Curable material, e.g. synthetic resin or rubber, which remains flexible after curing. The end region of the filter material is embedded in the flange material. In order to create a more secure bond, it is proposed that the filter material be equipped with a perforation such that the fluid material flows through the holes in the filter material while the flange piece is being cast and such that a peg connection is established between the filter material and the flange material.

In this known filter cartridge, it is considered disadvantageous that a casting mold is needed to cast the flange piece, a fact which, together with the relatively slow curing process, results in a long cycle time and therefore yields a low productivity.

Another disadvantage also lies in the fact that the body of the filter paper has to be provided with a perforation which must be produced in an additional processing step and which in the event of an incomplete casting also produces a short circuit between the raw air side and the clean air side.

Furthermore, a filter cartridge which has an end disk made of a sealing material is known from DE 38 38 540. This end disk is bonded to the filter paper body by means of a special adhesive. In addition, the end disk is designed such that a serration arises between the adhesive and end disk. However, the resulting disadvantage can now be observed in the fact that the end disk is a part which is complicated and costly to manufacture.

A further problem when using a filter cartridge for the intake air of an internal combustion machine lies in the fact that the seal—regardless of what form it takes—must exhibit an ideally long-term durability, i.e., that even with the long service intervals which are usual for motor vehicles, it must be assured that neither embrittlement nor cracks arise and that a certain permanent set remains intact which guarantees a good scaling behavior over a long period of time.

SUMMARY OF THE INVENTION

The object of the invention is therefore to avoid the noted disadvantages and to provide a filter cartridge composed of few construction parts or components and which at the same time assures a reliable seal between the raw air side and the clean air side.

This object is achieved by the present invention proceeding from the preamble of the main claim by means of its characterizing features.

The substantial advantage of the invention lies in the fact that the seal is comprised of a supporting medium and a sealing medium. Both the supporting medium and the sealing medium can thus each be adapted optimally for their tasks. For example, it is possible to manufacture the supporting medium of a polyurethane foam and to arrange the sealing medium made of silicone or silicone foam on the supporting medium. This arrangement has the advantage that an inexpensive supporting material can be combined with a costly sealing material. Moreover, it is possible to adapt the stiffness characteristics of the supporting materials optimally to the filter body and, on the other hand, to match the characteristics of the sealing medium optimally to the sealing structure. Thus, for example, sealing grooves can be provided on a sealing element which function in the manner of a lip seal or a labyrinth seal to produce a good sealing effect. In addition, there is the possibility of precisely adjusting the resilience by means of the arrangement of the sealing grooves.

In one embodiment the end disk can be manufactured in a so-called two-component process. This means that synthetic resins having different characteristics can be joined together during a single processing step.

In accordance with another embodiment of the invention, the supporting medium is a metal sheet which is coated with a sealing medium. Such metal plates are already pre-coated with for example an elastomer material and are stamped out or formed with the coating. This has the advantage that a subsequent application of a gasket to the metal plate supporting medium is no longer necessary. It is possible in an advantageous manner to provide the metal plate with a continuous peripheral bead. This bead improves the sealing characteristics, especially in conjunction with a corresponding sealing structure.

A refinement of the invention envisions arranging the sealing element axially or radially. Although the axial seal of a filter cartridge represents the seal which has heretofore been typical, the radial seal has the advantage that the length tolerances of the filter cartridge can be compensated in a simpler manner.

These and other characteristics of preferred embodiments of the invention, in addition to being found in the claims, are also disclosed in the specification and the drawings, whereby the individual characteristics each can be realized alone or together in the form of sub-combinations in embodiments of the invention and in other contexts, and may represent embodiments which are advantageous and patentable in their own right, for which protection is claimed here.

BRIEF DESCRIPTION OF THE DRAWINGS

Illustrative embodiments of the invention are shown in the drawings and are explained in more detail below. The drawings show.

DETAILED DESCRIPTION OF PREFERRED EMBODIMENT

Figure 1:
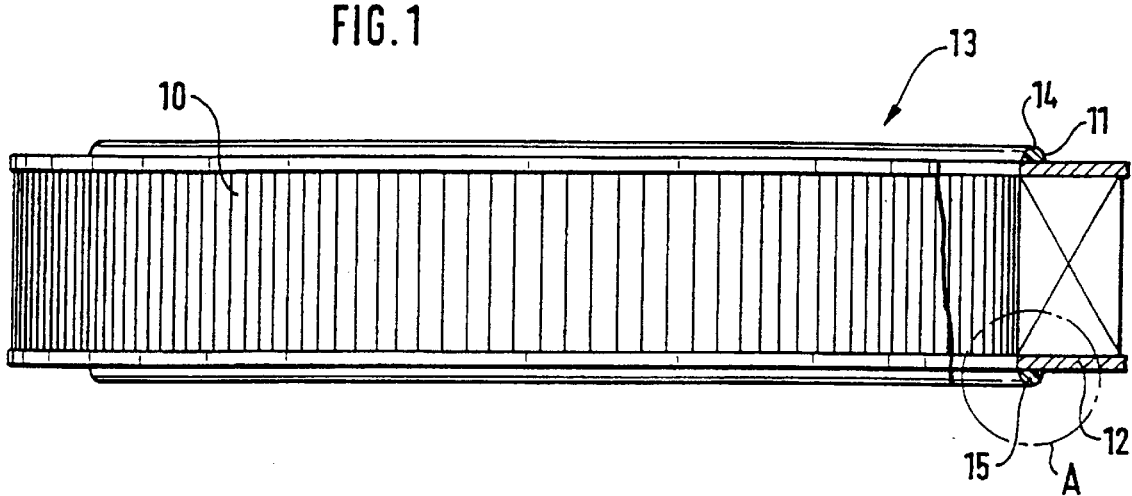
FIG. 1 a round cartridge in partial cross-sectional view.

In FIG. 1, a round cartridge is depicted in partial cross-sectional view. The cartridge comprises a filter medium 10—in particular a filter paper—which is folded in a zig-zag formation. This filter medium is provided at each of the two end faces with a respective seal 11, 12. The seals typically comprise a polyurethane resin foam which on the one hand covers and thus closes the end faces of the filter medium and on the other hand fixes and seals the filter cartridge 13 in a housing which is not shown here. For this purpose, the seals 11, 12 each have a annular bead 14, 15 which lies against a housing wall.

Figure 1A:
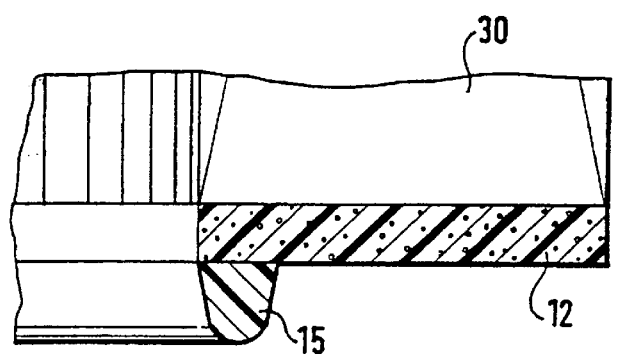
FIG. 1a detail A in a first variant.

In FIG. 1a, the detail A in FIG. 1 is shown in enlarged proportion. The annular bead 15 of the seal 12 is comprised of a material with very good sealing characteristics, which material also is stable over a long period of time. Preferably it is a silicone material or a silicone foam. Of course, it is also possible to use a Teflon material or a cellulose material.

The annular bead 15 is adhesively or cohesively bonded to the seal 12 comprised of polyurethane.

Figure 1B:
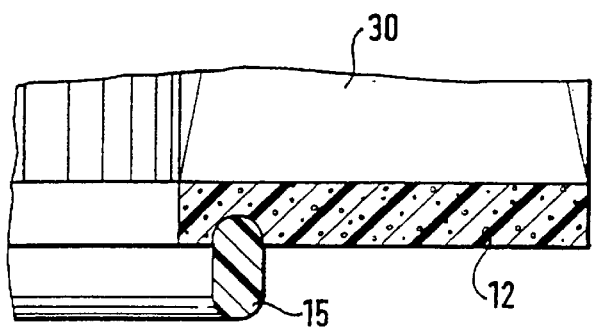
FIG. 1b detail A in a second variant.

In FIG. 1b, an alternative to FIG. 1a is depicted. Here, the annular bead is embedded in the seal 12. It is possible to provide the seal 12 with an undercut and to hook the annular bead into this seal. In any case, the assembly of the part 15 in the seal 12 must ensure that an unintended removal of the annular bead is prevented.

Figure 2:
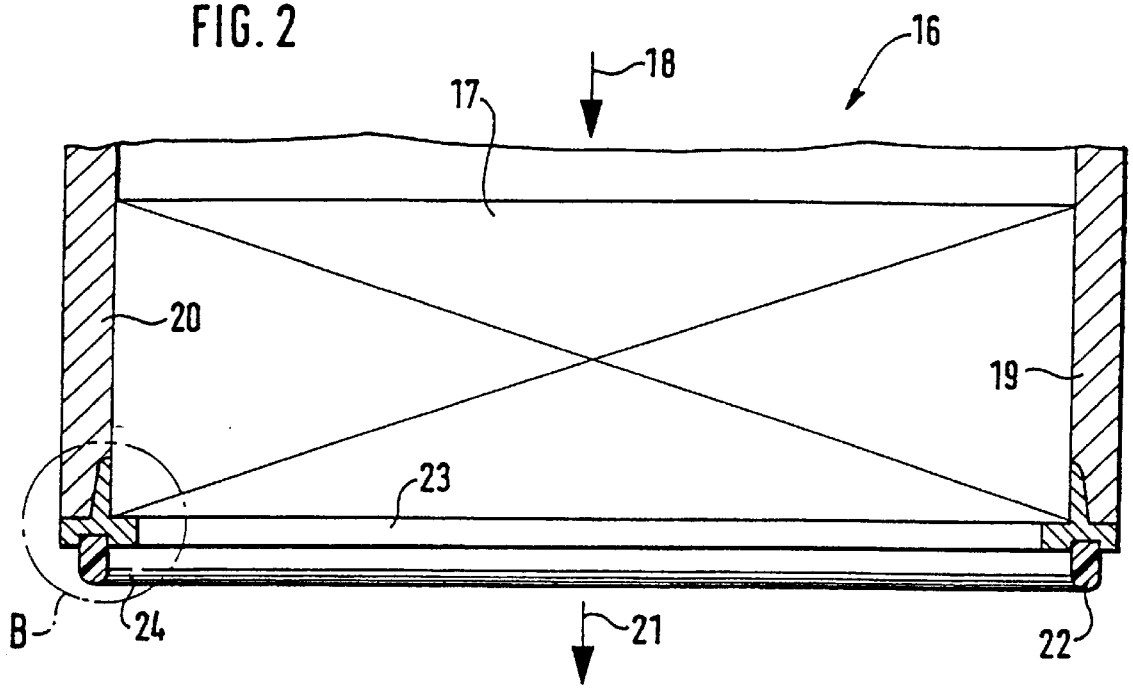
FIG. 2 a rectangularly shaped flat cartridge.

FIG. 2 shows a rectangular flat cartridge 16, which likewise is comprised of a filter paper 17 folded in a zig-zag manner. The flat cartridge 16 is contacted from above with a stream of raw air in accordance with arrow 18. The zig-zag folded filter paper is closed at the lateral surfaces 19, 20 and thus forms filter pockets. The contaminant particles which are present in the raw air collect in the filter pockets. The clean air leaves the filter element in accordance with arrow 21.

Figure 2A:
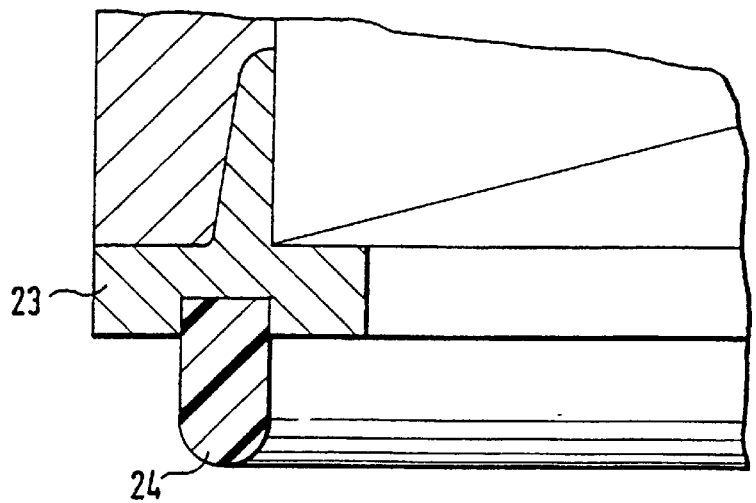
FIG. 2a detail B in FIG. 2.

The seal between the raw air chamber and the clean air chamber is effected occurs by means of the continuous seal 22. This seal 22 which is made of two components is shown in a detailed illustration according to FIG. 2a. The upper component is a supporting medium 23 and the lower component is a sealing medium 24. This sealing medium preferably is comprised of silicone. The supporting medium can be a polyurethane foam or a thermoplastic material. Naturally, it is possible to provide the sealing medium 24 with a suitable geometry which achieves a high sealing effect. Thus it is possible to provide the sealing medium with sealing lips which have a good sealing action.

Figure 3:
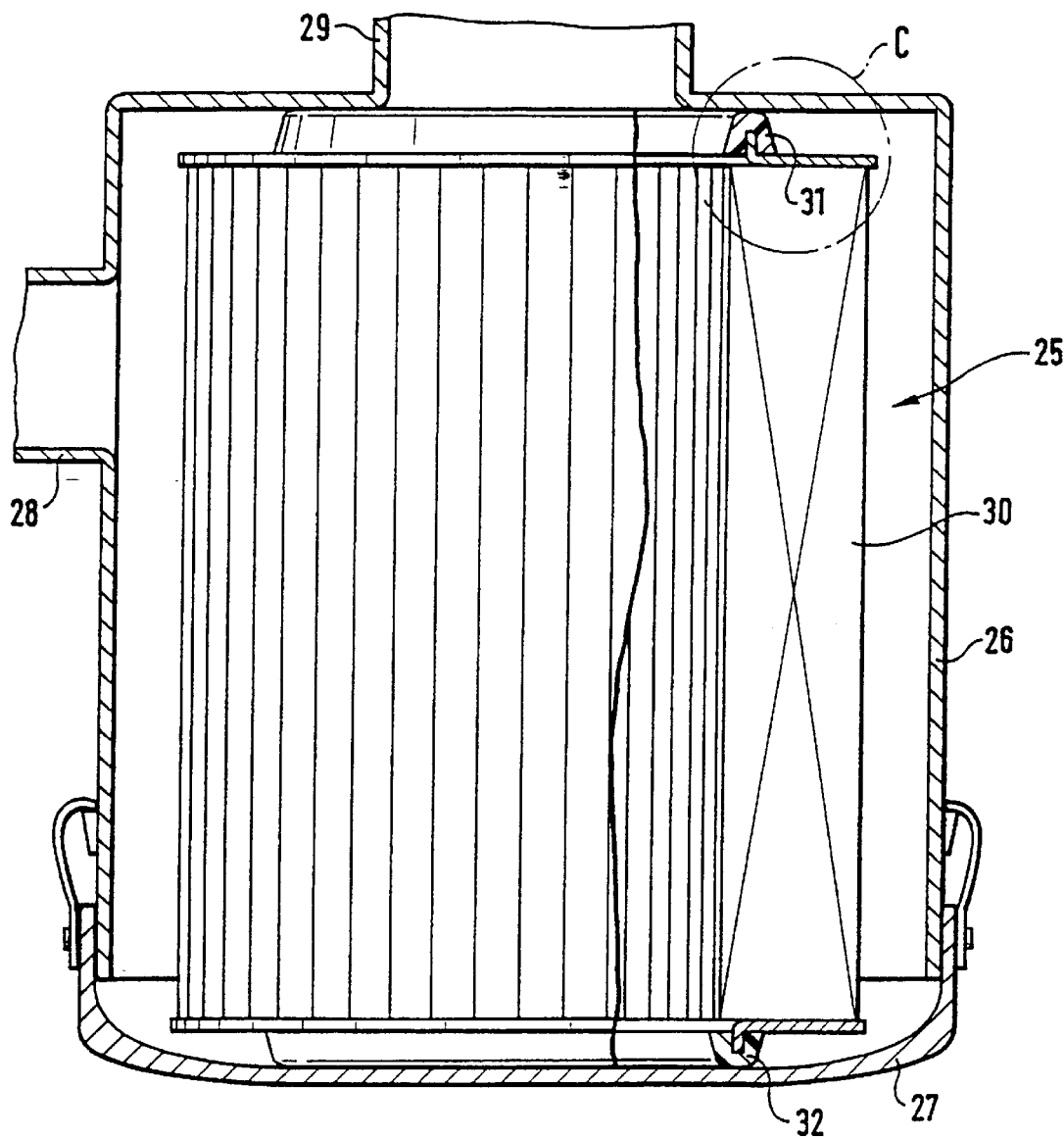
FIG. 3 a further round cartridge in partial cross-sectional view.
Figure 3A:
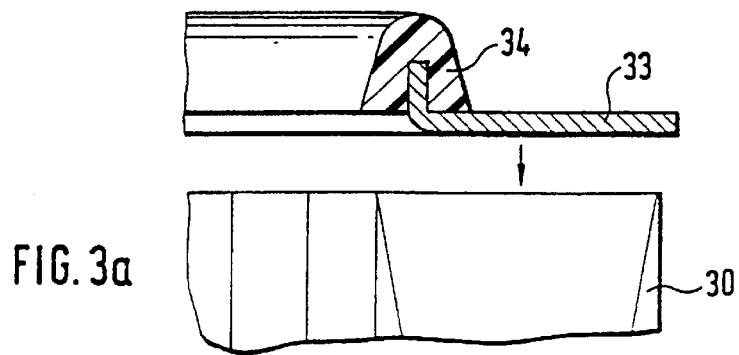
FIG. 3a detail C in FIG. 3.

FIG. 3 shows a round cartridge 25 in a filter housing 26. The filter housing 26 is closed with a cover 27 and has a raw air inlet 28 and a clean air outlet 29. Here, too, the filter cartridge 25 is comprised of a filter medium 30 which is folded in a zig-zag manner and which has seals 31, 32 at the end faces. These seals are—as shown in FIG. 3a—constructed of two components. A synthetic resin sheet 33 is involved here. On this synthetic resin sheet, a seal in the form of a silicone seal 34 is applied, these two parts bonded together and subsequently heated with the filter medium 30 in the vicinity of the contact surface and fastened to the filter medium 30 under pressure. The synthetic sheet is, for example, a thermoplastic material which can be partially heated when subjected to a heat source, e.g. by means of infrared light. Of course, it is also possible to make the supporting medium of paper, cardboard, or a metal.

Figure 4A:
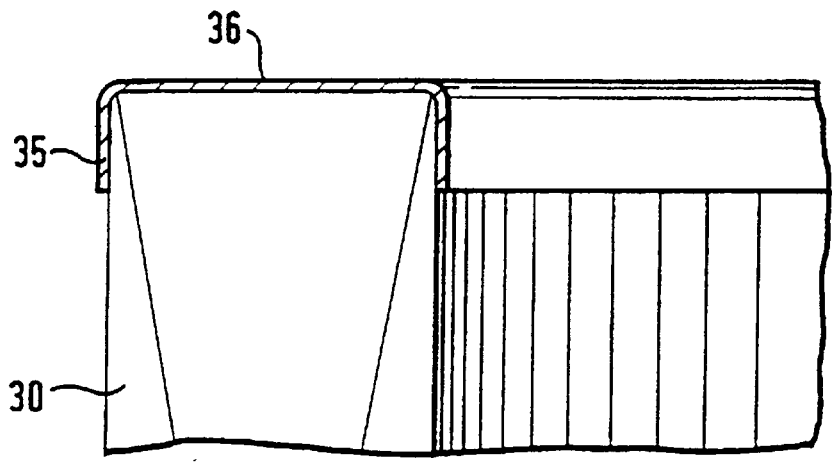
FIGS. 4a–c detailed illustrations of a round cartridge.
Figure 4B:
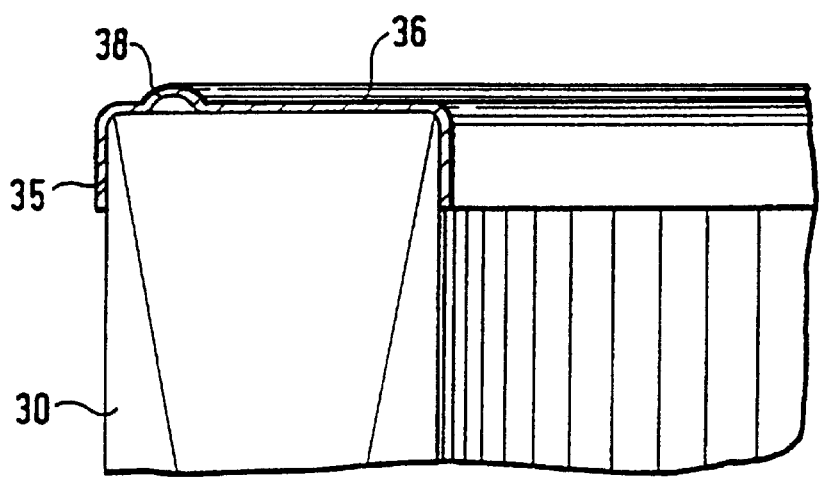
Figure 4C:
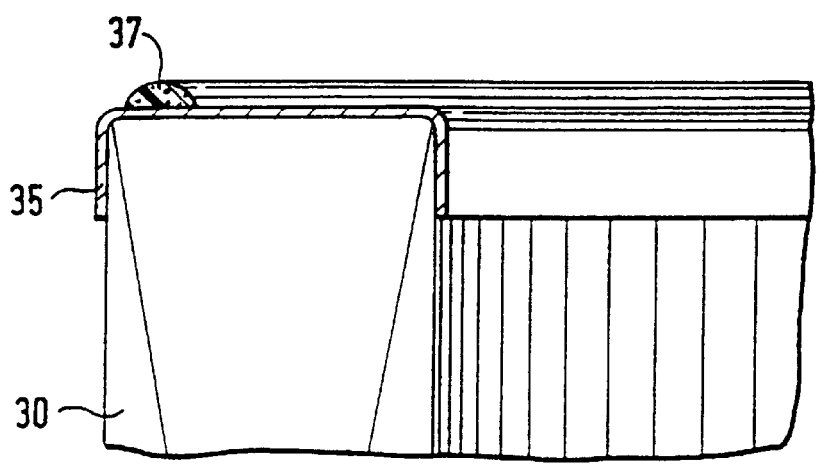

FIGS. 4a through 4c show detail views of a round cartridge as can be used, for example, in a housing in accordance with FIG. 3. The support medium 35 is comprised of a metal plate. This plate is fastened to the filter medium 30 by means of an adhesive bond. On the metal plate 35 there is a coating of an elastomer 36.

In accordance with FIG. 4b, the metal plate can be provided with a continuous peripheral ridge. In this case also the elastomer is also arranged to cover the entire surface of the metal plate. In contact with the housing, the ridge reinforces the sealing effect.

FIG. 4c shows a variation. There, the metal plate 35 is only provided in a narrow peripheral area with a seal 37 that has been expanded freely. Of course, there is also the possibility here of constructing the seal with sealing lips or of providing a desired sealing configuration.

What is claimed is:

1. A filter cartridge for an intake air filter of an internal combustion engine, said filter cartridge comprising a hollow cylindrical filter body which is comprised of a filter medium and which is provided on at least one end face thereof with an end disk, said end disk comprising a two-part sealing element which is comprised of a polyurethane foam support medium and a sealing medium composed of silicone or silicone foam.

2. A filter cartridge according to claim 1, wherein said filter medium is a filter paper web.

3. A filter cartridge according to claim 1, wherein the end disk is produced in a two-component injection molding process.

4. A filter cartridge according to claim 1, wherein the sealing medium is formed into an axially acting sealing element.

5. A filter cartridge according to claim 1, wherein the sealing medium is formed into a radially acting sealing element.

6. A filter cartridge according to claim 1, wherein the sealing medium is formed into an axially and radially acting sealing element.

7. A filter cartridge according to claim 1, wherein the sealing medium is formed into a lip seal which has a plurality of sealing grooves.

* * * * *